United States Patent [19]

Tamaki et al.

[11] Patent Number: 5,039,538
[45] Date of Patent: Aug. 13, 1991

[54] PROCESS FOR PRODUCING MARBLED MEAT

[75] Inventors: Kimie Tamaki, Tokyo; Koyoshi Tatsumi, Iruma; Tsuguaki Nishiya, Sayama; Naoyuki Hanawa, Kawagoe; Kazuo Ido, Hino, all of Japan

[73] Assignee: Snow Brand Milk Product Co., Ltd., Hokkaido, Japan

[21] Appl. No.: 476,240

[22] Filed: Feb. 7, 1990

[30] Foreign Application Priority Data

Mar. 7, 1989 [JP] Japan ................................. 1-52896
Jun. 26, 1989 [JP] Japan ................................. 1-160719

[51] Int. Cl.$^5$ ............................................. A23L 1/31
[52] U.S. Cl. .................................... 426/281; 426/573; 426/574; 426/652; 426/656
[58] Field of Search ............... 426/281, 652, 573, 574, 426/656, 513

[56] References Cited

U.S. PATENT DOCUMENTS 4,324,807 4/1982 Kim et al. ............................ 426/104

FOREIGN PATENT DOCUMENTS 284269 9/1988 European Pat. Off. ............ 426/281
59-173041 9/1984 Japan .................................. 426/652
62-146584 6/1987 Japan .................................. 426/281

Primary Examiner—Donald E. Czaja
Assistant Examiner—D. Workman
Attorney, Agent, or Firm—Browdy and Neimark

[57] ABSTRACT

The invention provides a process for producing marbled meat, which comprises dissolving protein in water, heating the protein solution at a higher temperature than a protein denaturation temperature, adding fat to the solution to emulsify the fat, cooling the obtained emulsion to a cold storage temperature of meat, and injecting the cold emulsion into the meat, and freezing to obtain gelled protein.

4 Claims, No Drawings

PROCESS FOR PRODUCING MARBLED MEAT

BACKGROUND OF THE INVENTION

The present invention relates to processes for producing marbled meat.

In the so-called marbled meat, meshy fat is dispersed in lean meat of beef, pork, etc.. When the meat is cooked and heated, a proper amount of fat is dissolved and the meat is tasted juicy and tender. On the other hand, the meat containing little fat, e.g. shoulder, round or ham does not taste juicy and tender. The meat is tough and considerably underestimated. For these reasons, there is a demand for more efficient methods for obtaining expensive marbled meat from cheap meat containing little fat. As a result, the following methods have been proposed. A method for injecting fat having melting points of 10°-35° C. into meat (Japanese Laid-open Patent Application No. 60-41467/1985), a method for injecting an emulsion containing a stabilization agent into meat (Japanese Patent Publication No. 59-23777/1984), lean meat reinforced by protein which is obtained by mixing a protein-reinforced compound with raw meat, and the protein contains 30 or more % by weight of whey protein (Japanese Laid-open Patent Application No. 56-102767-1981), a method for injecting an emulsion containing uncooked egg whites into meat (Japanese Laid-open Patent Application No. 59-162853/1984) and the like.

It is difficult to say that the marbled meat produced by the above conventional methods is similar to natural marbled meat in marbled conditions, forms and the like before or after cooking. For example, in the marbled meat obtained by the method by injecting fat having melting points of 10°-35° C. or an emulsion containing a stabilizer into meat, a large portion of the fat injected is eluted on heating. As a result, the weight loss of the meat on heating is high and juicy meat is not obtained. There are many problems associated with injection. One needs to inject the liquid at a higher temperature than the dissolution point of the fat or the emulsion. Since the emulsion should be injected into the meat at a higher temperature than the solidification point of fat, microorganisms are easily propagated.

In the lean meat reinforced by protein in which a protein-reinforced compound is mixed, or in the method for injecting an emulsion containing uncooked egg whites into meat, the aqueous protein solution is present in the emulsion injected into the meat as it is. For this reason, when the meat is frozen or defrosted in reservation and circulation stages, protein is mixed in drips and flows out. The drips become cloudy and the appearance of the meat become bad. The fat can not be kept in the meat on heating.

SUMMARY OF THE INVENTION

Accordingly, an object of the present invention is to solve these problems and to provide a process for producing marbled meat wherein fat is added to the parts having relatively a little amount of fat, whereby the marbled meat having good appearances, no defects on cooking, the taste and texture substantially similar to natural marbled meat can be obtained.

For solving the above problems, the present invention provides a process for producing marbled meat having excellent appearances, no defects on cooking, taste and texture. The process comprises heating a protein solution at a higher temperature than a protein denaturation temperature, adding fat to the solution to obtain an emulsion, cooling the emulsion to a cold storage temperature of meat, and injecting the cold emulsion into the meat.

DETAILED DESCRIPTION OF THE INVENTION

In the process of the present invention, the heating temperature of the protein solution is higher than the temperature required to denature the protein. The heating time can be selected so that the protein solution remains in liquid form as a continuous phase of the emulsion after heating the solution and gelation of the protein after injecting the solution into the meat and freezing the meat. For example, when a 10% solution of whey protein is heated, the heating time is preferably 20 to 60 minutes at 80° C., 20 seconds to 5 minutes at 90° C. and 2 to 5 seconds at 110° C. When the heating time is shorter than the preferable time, protein gelation does not occur after freezing the meat. As a result, after freezing and defrosting the meat, drips become cloudy and the appearances of the meat becomes no good. When the heating time is longer than the preferable time, gelation of the protein occurs before producing the emulsion, and the fluidity of the emulsion is hardly obtained, so that it becomes difficult to emulsify the fat and to inject it into the meat. Even if the protein solution is emulsified, the viscosity of the obtained emulsion increases and it becomes difficult to inject the emulsion into the meat. Furthermore, the fat dispersion is insufficient so that lumps of fat are obtained.

As the meat in which emulsion is injected, meat such as beef, pork, horseflesh, mutton, goat meat, etc., domestic fowls of chicken, turkey, goose, duck, etc., and hare meat can be exemplified and their low fat parts are used.

Taste of meat is improved by injecting the fat used in the present invention. Fat having its origin in animals and vegetables is fluid at lower temperatures than that denaturing the meat. Since the fat is maintained in the meat by the gelation of protein, it should not solidify at a low temperature.

The protein used in the present invention is liquid after heat treating, fat and water are emulsified by the aqueous solution of the protein, and the protein is gelable by freezing. The resulting protein gel acts to bind tissues of fat. Namely, the fat is kept in the meat before the fat is treated by heat and a part of the fat is molten out of the meat by heat. The fat liquid is kept in the meat and juicy taste can be obtained.

As the animal and vegetable protein used in the present invention, whey protein, egg white protein, whole egg protein, egg yolk protein and soy-bean protein can be exemplified. Whey protein and egg white protein are preferably used because they have the same color as the fat tissues have, the taste is good and the viscosity of the emulsion is suitable for dispersing the fat injected into the meat.

The ratio of fat to protein to water in the emulsion and the amount of the emulsion are suitably determined by considering the fat content and the toughness of meat to inject the emulsion.

The fat ratio, for example beef tallow, in the emulsion is usually 10 to 60% by weight, preferably 20 to 50% by weight. When the fat ratio is higher than 60% by weight, a stable emulsion is not obtained and it is difficult to inject the emulsion into the meat for the high viscosity. When the fat ratio is lower than 10% by weight, obtaining the marbled meat cannot be expected.

The protein ratio in the emulsion, for example when whey protein is used, it is preferably 2.0 to 18.0% by weight and, when egg white protein is used, it is preferably 0.8 to 9.0% by weight. When the protein ratio is lower than the above values, there is no gelation of protein after freezing the meat, and drips become cloudy and the appearances of the meat are unsatisfactory after freezing and defrosting the meat. When the protein ratio is higher than the above values, gelation of the protein occurs before the emulsion is produced, and the fluidity of the emulsion is hardly obtained, so that it becomes difficult to emulsify the fat and to inject the emulsion into the meat.

The emulsion can be prepared by using a conventional emulsifier at a higher temperature than a temperature for hardening the fat. When whey protein and beef fat are emulsified, the temperatures are preferably 50° to 60° C. The emulsifying times are suitably 3 to 10 minutes. After the emulsion is obtained, it is desired to cool as soon as possible so as to improve the stability of the emulsion and to avoid the excessive thermal denaturation of the protein.

The protein solution can be prepared by using a conventional heater.

The obtained emulsion is injected into the meat at 0° to 10° C. When the temperature is higher than 10° C., micro-organisms increase. When the temperature is lower than 0° C., the emulsion can not be dispersed in the meat because the frozen meat is obtained. For injecting the emulsion into the meat, for example, a conventional injector can be used.

Since the emulsion is injected into the meat after cooling to a temperature for keeping the meat in cold storage, the problems of the increase of micro-organisms and the like can be solved. Since the emulsion injected into the meat is gelable by freezing, even if the meat is frozen and defrosted in processes of storing and marketing of the meat, drips of the meat are transparent and good appearances can be kept.

The marbled meat obtained by the above method of the present invention resembles natural marbled meat in appearances, suitability for cooking, taste and the texture. When the meat is heated and cooked, a part of the injected fat is molted out of the meat, the other part of the injected fat is liquid and kept in the meat. Accordingly, the meat can keep delicious and juicy taste.

DESCRIPTION OF PREFERRED EMBODIMENTS

The following Examples illustrate the present invention more specifically.

EXAMPLE 1

Sixty grammes of whey protein (protein content: 75%) was dissolved in 540 grammes of water and the solution was heated at 80° C. for 40 minutes. 400 grammes of purified beef tallow was heated at 60° C. to melt and added to the whey protein solution for 5 minutes with stirring at 10,000 rpm by using a homomixer. An emulsion was prepared. The emulsion was immediately cooled to 7° C.

The viscosity of the emulsion obtained was 202 centipoises by using a B type viscometer at 30 rpm. One kg of the emulsion was injected into 5 kg of round produced in Japan. After freezing, the round was sliced into a thickness of one cm and the obtained slices were defrosted at 5° C. in a refrigerator. The drips which flowed out from the slices defrosted were red and transparent. White cloudy drips were not observed.

After the product finally obtained was heated on a flying pan, the taste and the texture were estimated. As shown in Table 1, the results of the meat of the present invention are almost the same as those of natural marbled beef.

EXAMPLE 2

200 grammes of raw egg whites (protein content: 10.4%) were diluted in 400 grammes of water and heated at 80° C. for 10 minutes. 400 grammes of purified beef tallow was heated at 60° C. to melt and added to the egg white solution for 5 minutes with stirring at 10,000 rpm by using a homomixer. An emulsion was prepared. The emulsion was immediately cooled to 7° C. The viscosity of the emulsion obtained was 250 centipoises by using a B type viscometer at 30 rpm. One kg of the emulsion was injected into 5 kg of round produced in Japan. After freezing, the round was sliced into a thickness of one cm and the slices obtained were defrosted at 5° C. in a refrigerator. The drips which flowed out from the slices defrosted were red and transparent. White cloudy drips were not observed.

After the product finally obtained was heated on a frying pan, the taste and the texture were estimated. As shown in Table 1, the results of the meat of the present invention are almost the same as those of natural marbled beef.

EXAMPLE 3

80 grammes of whey protein (protein content: 75%) were dissolved in 720 grammes of water and heated at 80° C. for 30 minutes. 200 grammes of purified beef tallow was heated at 50° C. to melt and added to the whey protein solution for 5 minutes with stirring at 10,000 rpm by using a homomixer. An emulsion was prepared. The emulsion was immediately cooled to 7° C.

The viscosity of the obtained emulsion was 123 centipoises by using a B type viscometer at 30 rpm. One kg of the emulsion was injected into 5 kg of round produced in Japan. After freezing, the round was sliced into a thickness of one cm and the obtained slices were defrosted at 5° C. in a refrigerator. The drips which flowed out from the defrosted slices were red and transparent. White cloudy drips were not observed.

After the product obtained finally was heated on a frying pan, the taste and the texture were estimated. As shown in Table 1, the results of the meat of the present invention are almost the same as those of natural marbled beef.

COMPARATIVE EXAMPLE 1

Purified beef tallow was treated under the same conditions as in Example 1 except that whey protein was not heated. The results are shown in Table 1.

COMPARATIVE EXAMPLE 2

Purified beef tallow was treated under the same conditions as in Example 2 except that raw egg whites were not heated. The results are shown in Table 1.

TABLE 1

| | Fat appearance before heating | Drips | Amount of fat molten on heating | Taste & texture |
|---|---|---|---|---|
| Not treated* | Scattered | Red, transparent | Not any | Tough, not juicy |
| Example 1 | Marbled | Red, transparent | A part, like natural marbled meat | Soft, juicy, fragrant fat |
| Example 2 | Marbled | Red, transparent | A part, like natural marbled meat | Soft, juicy, fragrant fat |
| Example 3 | Marbled | Red, transparent | A part, like natural marbled meat | Soft, juicy, fragrant fat |
| Comparative Example 1 | Marbled | White, cloudy | Much, shrunk meat | Tough, not juicy |
| Comparative Example 2 | Marbled | White, cloudy in part | Much, shrunk meat | Tough, not juicy |

*: "Not treated" means that fat is not injected in the meat.

We claim:

1. A process for producing a marbled meat product using a protein-gelling method comprising heating and freezing said protein, comprising:
   dissolving protein in water to form a protein solution;
   heating said protein solution at a temperature above the temperature of denaturation of the protein;
   adding fat to the solution and emulsifying said fat into said solution to form an emulsion;
   cooling said emulsion to the temperature of raw meat;
   injecting said cold emulsion into raw meat; and
   gelling said emulsion within said meat by freezing said meat.

2. A process according to claim 1, wherein the protein is whey protein or egg whites.

3. A process according to claim 1, wherein the emulsion comprises 10–60 parts by weight of fat, 0.8–18.0 parts by weight of protein and 32.0–88.2 parts by weight of water.

4. The process according to claim 2 wherein said protein solution is heated at a temperature of from 80°–110° C. for a period of from two seconds to 60 minutes.

* * * * *